Oct. 28, 1958 M. M. HURST 2,857,921
VEHICLE WHEEL CLEANING DEVICE
Filed July 25, 1955 3 Sheets-Sheet 1
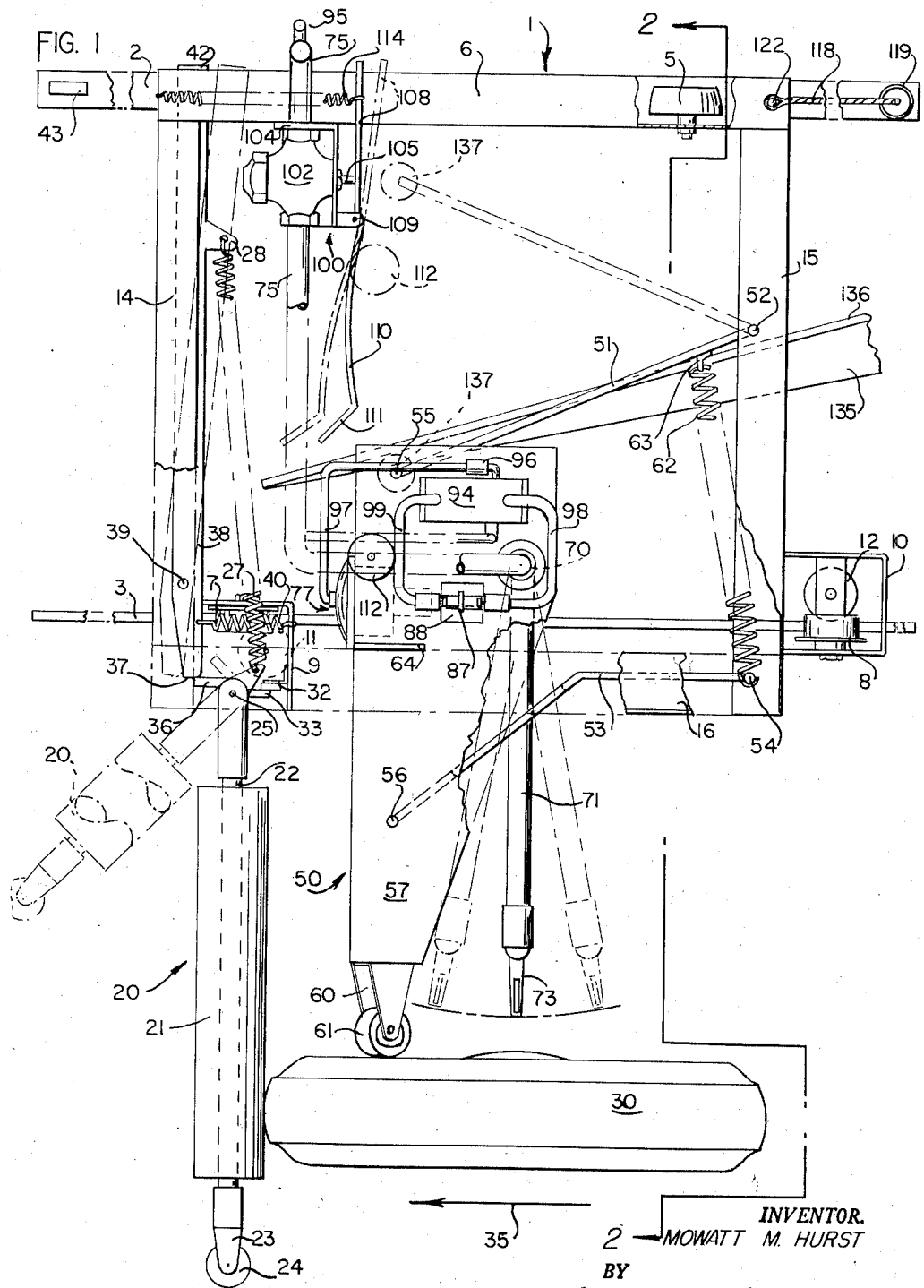
INVENTOR.
MOWATT M. HURST
BY
Boykin, Mohler & Wood
ATTORNEYS Oct. 28, 1958 M. M. HURST 2,857,921
VEHICLE WHEEL CLEANING DEVICE
Filed July 25, 1955 3 Sheets-Sheet 2
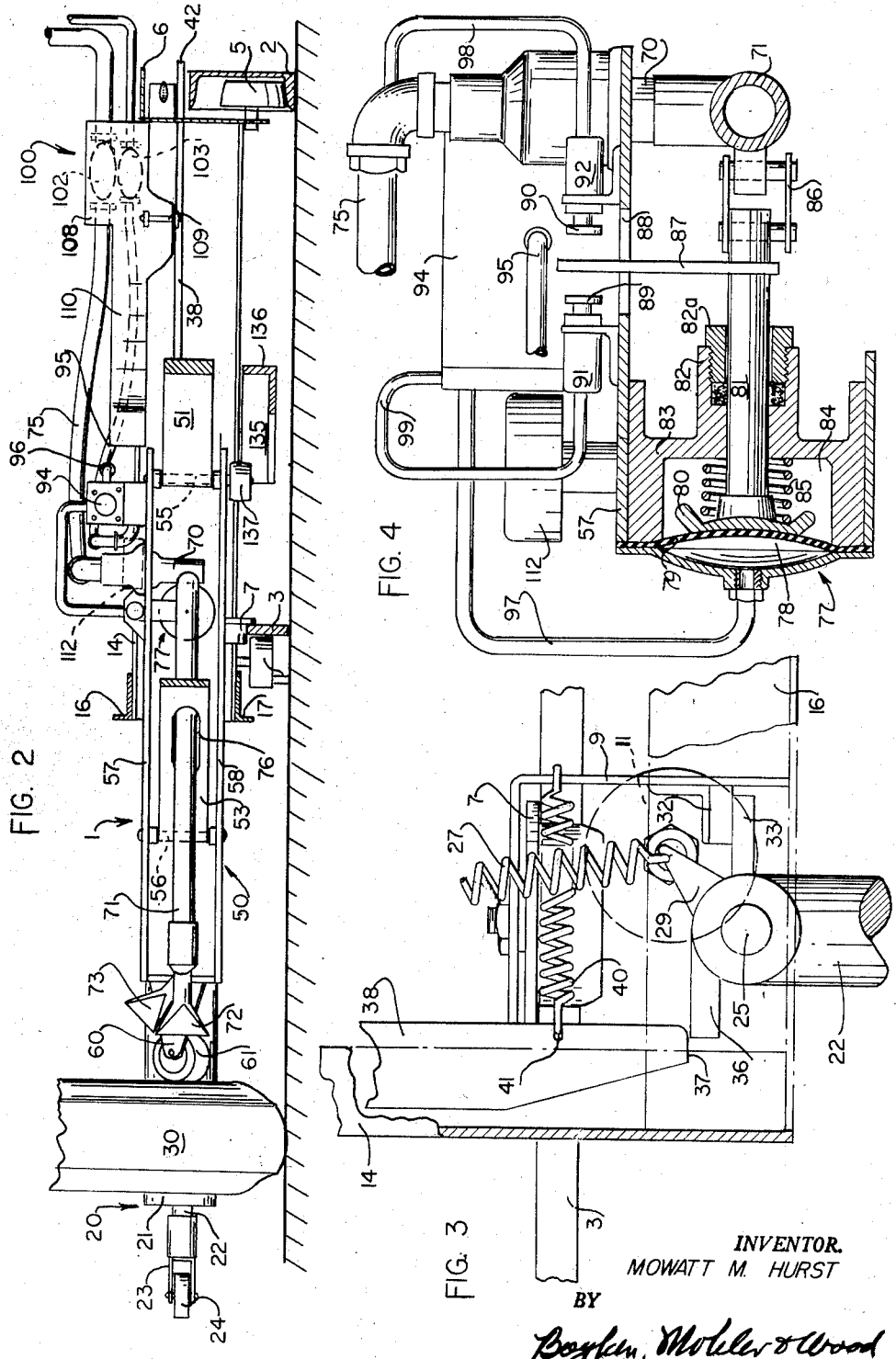
INVENTOR.
MOWATT M. HURST
BY
Boyken, Mohler & Wood
ATTORNEYS Oct. 28, 1958 — M. M. HURST — 2,857,921
VEHICLE WHEEL CLEANING DEVICE
Filed July 25, 1955 — 3 Sheets-Sheet 3

INVENTOR.
MOWATT M. HURST
BY
Boykin, Mohler & Ward
ATTORNEYS

United States Patent Office 2,857,921
Patented Oct. 28, 1958

2,857,921

VEHICLE WHEEL CLEANING DEVICE

Mowatt M. Hurst, Palo Alto, Calif.

Application July 25, 1955, Serial No. 524,170

4 Claims. (Cl. 134—45)

This invention relates to motor vehicle cleaning devices and more particularly to an automatic device for cleaning the wheels and tires of motor vehicles as part of the general vehicle cleaning operation.

Automatic machinery and methods have heretofore been proposed for the cleaning of vehicle wheels and tires, however, all have proven expensive either in maintenance and replacement of expendable items thereof or in high initial cost and high installation cost.

The main object of the present invention is the provision of an automatic wheel and tire washing device that is adapted to wash the wheels and tires of a vehicle as the latter is moved along a path of travel, said device being relatively inexpensive and free of high maintenance costs.

Another object of the present invention is the provision of a device for automatically washing the wheels and tires of a vehicle, said device eliminating the need of expensive expendable items requiring periodic replacement.

Another object of the present invention is the provision of a device for automatically cleaning the wheels and tires of a vehicle that requires a minimum of floor space, and automatically adapts itself to the speed with which said vehicle moves along its path of travel during the general vehicle cleaning operation.

Yet another object of the invention is the provision of a device for automatically cleaning the wheels and tires of a vehicle by means of an oscillating jet of steam and detergent impinging upon said wheel and tire to produce a cutting, cleansing action to loosen and float away the dirt and road grime adhering to said wheel and tire.

Yet another object of the present invention is the provision of a device that can be disposed on either side of said vehicle for simultaneously cleaning the wheels and tires on both sides of said vehicle.

Other objects and advantages of the present invention will be apparent from the specification and drawings herein.

Fig. 1 is a semischematic top plan view showing the invention in its operating position washing a vehicle wheel and tire.

Fig. 2 is a semischematic side sectional view taken along line 2—2 of Fig. 1.

Fig. 3 is an enlarged partly broken away top view showing the details of the trigger bar and its means of coacting with the driving roller.

Fig. 4 is a semischematic, enlarged front sectional view showing the balanced spool air valve, relief poppets, diaphram-type piston, and connecting linkage to actuate the oscillating cleaning jet.

Figure 6:
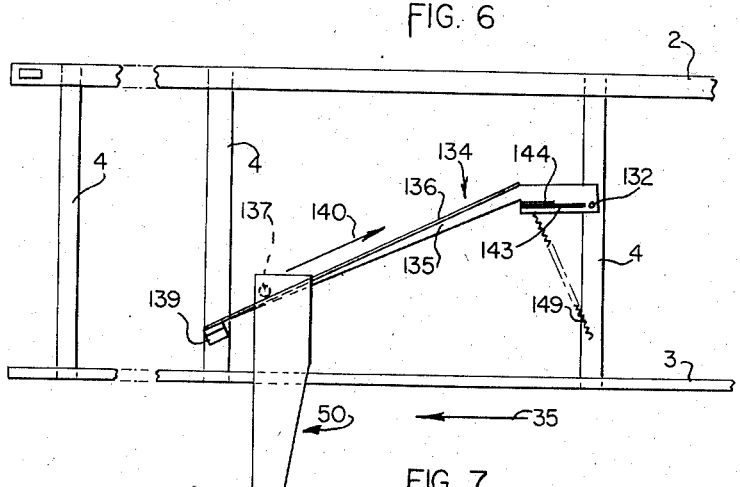
Figs. 6 to 8 are reduced schematic views showing the operation of the switch blade in the course of one cycle of movement of the carriage of the invention.

The mechanism of the present invention is adapted for installation upon any suitable foundation within the structure or building where the wheel and tire washing operation is to be carried out.

The movable carriage of the present invention is adapted to move along a predetermined, limited path of travel parallel to the path of travel of the vehicle whose wheels and tires are being washed, and said movable carriage is further adapted to traverse said path upon a track which is secured to the aforementioned foundation.

Generally the present invention comprises a wheeled carriage adapted to ride upon a pair of parallel, longitudinally extending bars forming a track for the carriage. Said carriage being adapted to contain thereon an oscillating nozzle through which the steam and detergent is directed upon the wheel and tire of a vehicle, a valve and piston mechanism for controlling the operation and an inwardly extending roller which supplies the motive force to the carriage by means of rolling contact with the outer periphery of the wheel of the vehicle.

As used herein the term "wheel" when used to describe the wheel and tire of a vehicle will be understood to include a wheel fitted with a tire. The direction "forward" will be along the path of travel of the vehicle, "inner" will refer to the side adjacent the vehicle while "outer" will refer to the side away from the vehicle.

In detail, as best seen in Figs. 1, 2, the present invention in its preferred form comprises a carriage assembly generally designated 1 which is adapted to ride on outer and inner elongated track elements 2, 3, respectively. Outer track element 2 is a standard structural channel bar resting on one of its flanges with the web portion directed outwardly from the vehicle. Inner track element 3, spaced apart from and parallel to element 2 is a conventional flat bar, rectangular in cross section, resting upon one of its narrow sides. Track elements 2, 3 are rigidly held in spaced parallel relationship by means of cross tie elements 4 (Figs. 6–8) spaced at intervals and mounted perpendicular to track elements 2, 3 as by welding.

As a means of providing rolling engagement between the carriage 1 and track element 2, a pair of spaced apart, vertical coplanar cambered wheels 5 are rotatably mounted on the outer side of a downward directed flange of carriage frame member 6. Wheel elements 5 are adapted to provide rolling engagement within the enclosed portion of channel track element 2 by riding upon the upper surface of the lower flange thereof (Fig. 2).

As a means of providing rolling engagement between the carriage 1 and inner track element 3 a pair of spaced apart, vertical coplanar flanged wheels 7, 8 are rotatably mounted within wheel support housings 9, 10 (Fig. 1). The flanged portion of wheel 7 bears alongside the outer surface of track element 3 and the flanged portion of wheel 8 bears alongside the inner surface of track element 3. This is done to provide a guiding means to hold the outer periphery of wheels 7, 8 centrally along the upper surface of track element 3.

To further increase stability and to prevent possible derailment of carriage 1 due to the turning moment caused by the wheel 30 of the vehicle bearing upon the driving roller 20, horizontal roller elements 11, 12 rotatably mounted, substantially coplanar, are provided adjacent and below flanged wheels 7, 8. Forward roller element 11 is mounted to bear against the inner upright surface of track element 3, and rear roller 12 is mounted to bear against the outer upright surface of said track element 3 (Fig. 1).

In detail, the frame structure of carriage 1 comprises a pair of parallel spaced channel bar members 14, 15 mounted perpendicular to the path of travel of said vehicle. The web portion of forward frame member 14 faces forwardly and the web portion of rear frame member 15 faces rearwardly. Mounted perpendicularly to and coterminous with the outer ends of frame members 14, 15, as by means of welding, is rear frame member 6. Rear frame member 6 is angle bar shaped in cross section with unequal flange lengths, the longer flange being downwardly directed and of a length somewhat longer than the width across the flanges of frame members 14, 15. This orientation, of course, places the shorter flange of rear frame member 6 in a horizontal position, said shorter flange being directed outwardly from the carriage and overlying the outer track element 2.

As best seen in Fig. 2, vertically spaced inner angle bar shaped frame members 16, 17 are horizontally mounted, as by means of welding, coterminous with and perpendicular to the inner ends of frame members 14, 15. The upper frame member 16 has unequal flange lengths, with the longer flange being placed horizontally on the upper sides of the top flanges of channel shaped frame members 14, 15, and the shorter flange being upwardly directed and adjacent the inner ends of said frame members 14, 15. Lower frame member 17 is similarly shaped to member 16, the longer flange being mounted on the lower sides of the bottom flanges of said frame members 14, 15, and the shorter flange being downwardly directed adjacent the inner ends of said frame members 14, 15. The entire frame structure of carriage 1 may be formed into an integral, rigid unit as by welding.

As a means of providing the driving force to move the carriage 1 in a forwardly direction parallel to the path of travel of the said vehicle, and as a means of providing for the automatic adjustment of rate of travel and placement of carriage 1 reltaive to the rate of travel and placement of the ground wheels of said vehicle, an inwardly extending, horizontal driving roller assembly, generally designated 20, is provided pivotally mounted to the inner forward portion of carriage 1.

Roller assembly 20 comprises an elongated cylindrical roller 21 rotatably mounted coaxially on shaft 22. Roller 21 extends inwardly towards said vehicle a sufficient distance to allow said roller assembly 20 to accommodate a large variety of vehicles of different tread widths. Rotatably mounted, between a pair of spaced apart inwardly directed horizontal flanges 23, carried by the inner end of driving shaft 22, is a roller return guide wheel 24. The purpose and action of said roller return guide wheel 24 will subsequently be described in detail along with the description of the return movement of carriage 1.

The outward end of driving shaft 22 is pivotally mounted as by vertical pin 25 to inner frame elements 16, 17 to allow roller assembly 20 to swing in an arc forwardly to the dot-dash line position indicated in Fig. 1.

Roller assembly 20 is yieldably urged to the inner full line position of Fig. 1 by means of coiled tension spring 27 connected to rearward extending lug 28 on frame member 14 and a similar lug 29 on the outer end of driving shaft 22.

As a means of positively limiting the rearward swing of roller assembly 20, a rubber faced stop element 32 is rigidly affixed to the forward wheel housing 9 to opposedly face the rearwardly directed stop element 33 mounted perpendicular to and coterminous with the outer end of driving shaft 22.

It is apparent from the described structure that roller assembly 20 is yieldably urged to a position transversely of the path of tracks 2, 3 and is prevented from over travel in a rearward direction by coacting stop elements 32, 33.

As the vehicle ground wheel 30 advances forward in the direction indicated by arrow 35, the outer periphery of wheel 30 rotatably engages cylindrical roller 21 which thereby imparts a forwardly directed driving force upon drive shaft 22. Driving shaft 22 transmits this forward force to the carriage 1 by means of vertical pin 25, thereby causing carriage 1 to move along with the rotating ground wheel 30 for a predetermined distance.

As a means of preventing roller assembly 20 from swinging forwardly or clockwise in Fig. 1 under the influence of the driving force, sear 36 is provided (Fig. 3). Sear 36 is rigidly mounted at right angles to the outer end of driving shaft 22 in a forwardly extending position to engage the inner end 37 of pivotally mounted trigger bar 38. Trigger bar 38 is pivotally mounted, as at 39, to frame member 14 within the enclosure of the web and flanges of the latter. When trigger bar 38 lies perpendicular to the path of travel indicated by arrow 35 the inner end 37 of trigger 38 provides a stop against which sear 36 bears to prevent the forwardly swinging of roller assembly 20. Trigger bar 38 is yieldably urged to said perpendicular position by means of coiled tension trigger spring 40. Said trigger spring 40 is mounted substantially perpendicular to trigger 38 and connects between forward wheel housing 9 and through aperture 41 formed in trigger bar 38.

As the carriage 1 moves forwardly along its path of travel, due to the driving influence of roller assembly 20 to its predetermined limit, the trigger mechanism and roller assembly 20 cooperate in the aforementioned manner. Upon the carriage 1 reaching its limit of travel, the front outer end 42 (Fig. 1) that extends through slot (not shown) in the downward directed flange of frame member 6, engages a stop lug 43, rigidly affixed as by welding, to the upper surface of the top flange of track element 2. Further forward movement of carriage 1 then causes trigger bar to pivot about pin 39 in a clockwise direction. This releases sear 36 from engagement with end 37 of trigger 38 allowing the forward driving force to pivot roller assembly 20 about the axis of pin 25.

As the forwardly acting driving force is now no longer applied, carriage 1 ceases further forward motion and is allowed to be returned to its starting position by a counter force acting in a rearward direction, said counterforce to be later described in detail.

As carriage 1 returns to its starting position by means of said counterforce, roller assembly 20 is caused to pivot about pin 25 due to the sliding contact between roller assembly 20 and vehicle wheel 30. To prevent the end of roller assembly from possibly scratching or otherwise marring the surface of said wheel 30 as the former slides past the latter, inward extending horizontal guide wheel 24 is provided to guide the inner end of roller assembly across the surface of said vehicle ground wheel.

The means for washing the vehicle wheel will now be described.

Mounted on carriage 1 is a parallel motion linkage consisting of an outer, horizontally elongated, substantially forwardly directed vertically disposed arm 51 pivotally mounted at its rear end to rear frame member 15 between the flanges thereof by pin element 52; and inner, elongated, substantially forwardly directed, vertically disposed, bent arm 53 pivotally mounted at its rearward end to the inner corner portion of rear frame member 15 between the flanges thereof by pin element 54. Pin elements 52, 54 are mounted vertically coplanar and perpendicular to the path of travel indicated by arrow 35 and are spaced apart a somewhat lesser distance than the length of parallel arm 51 (Fig. 1).

The forward ends of parallel acting arms 51, 53 are pivotally mounted in spaced parallel relationship, as by means of pins 55, 56 respectively to a reciprocable arm unit generally designated 50. Said unit comprises an upper plate 57 and a lower plate 58 (Fig. 2) pivotally connected to arms 51, 53 as at pivots 55, 56. In this embodiment of the invention the horizontal, parallel spaced apart plate members 57, 58 constitute the major portion of the frame work of arm unit 50. As seen in Fig. 1, plate members 57, 58 are essentially rectangular in plan view and are elongated transversely of the path of travel of carriage 1.

Reciprocable arm 50 is adapted to contain thereon and house therein the component parts of the wheel washing mechanism, which will now be further described.

Rotatably mounted on a rearwardly and upwardly inclined axis between bifurcated yoke 60 is an arm guiding roller wheel 61. Yoke 60 is mounted on the inner end of reciprocable arm 50, between plate members 57, 58. Guide wheel 61 is adapted to rotatably engage the outer side portion of vehicle wheel 30 adjacent the periphery thereof to automatically position and maintain the correct space between vehicle wheel 30 and reciprocable arm 50.

Arm 50 is yieldably urged to an inwardly projected position (between frame members 16, 17) by means of coiled tension spring 62 connected to pivot pin 54 and a clip 63 mounted somewhat forwardly of pivot pin 52 on the inner side of parallel arm 51. Arm 50 is prevented from over travel in an inwardly direction by means of rubber faced stop element 64 mounted atop upper plate element 57. Stop element 64 is adapted to engage the outwardly directed edge of frame member 16 upon arm 50 reaching its inner limit of travel.

Swivelly mounted as by means of steam proof swivel joint 70 to the lower surface of upper plate 57 is an inwardly directed elongated nozzle arm 71 terminating at its inner end in a pair of fan shaped vertically disposed nozzle elements 72, 73 (Fig. 2). Nozzle arm 71 passes through the horizontally elongated opening between inner frame members 16, 17 and is further directed inwardly towards vehicle ground wheel 30.

Elongated slot 76 is provided in bent arm 53 to allow nozzle arm 71 to pass therethrough. Parallel acting inner arm 53 is bent to provide sufficient clearance for oscillating nozzle arm 71 as the latter extends through the former.

Nozzle 72 is mounted coaxially with nozzle arm 71 and nozzle 73 is branched off at an upwardly directed angle from nozzle arm 71. Nozzle arm 71 is adapted for rapid oscillation in a limited arc, as indicated by dot-dash line position (Fig. 1), and is further adapted to receive therethrough a mixture of steam and dissolved detergent to be forcibly impinged through nozzle elements 72, 73 upon the outer surface of vehicle wheel 30. Upon passing through an automatically controlled valve, to be later described in detail, the mixture of steam and detergent enters the swivel joint 70 and nozzle arm 71 by means of a flexible conduit such as a rubber hose 75.

As best seen in Fig. 4, the oscillation of nozzle arm 71 is effected by a fluid actuated single acting diaphragm type piston generally designated 77. As used in this preferred form of the invention the term "fluid" will be understood to include a gaseous substance such as air, which in fact is used, however, any fluid whether liquid or gas can be utilized to supply the piston actuating medium. Piston 77 comprises an air expansion chamber 78 adapted to receive compressed air therein, a flexible diaphragm 79 forming a yieldable piston which is backed up on the reduced pressure side 84 thereof by a coaxially placed complementarily formed rigid bearing element 80. Coaxially mounted to bearing element 80 is an elongated, horizontal piston rod 81 extending rearwardly through a packing gland element 82a on the rear end of the reduced diameter portion 82 of cylinder 83.

Coaxially surrounding the piston rod 81 within the reduced pressure portion 84 of piston assembly 77 is a helical compression spring 85. Compression spring 85 is adapted to bear upon bearing element 80 to produce the return stroke of piston diaphragm 79 and rod 81. Swivelly mounted between the outer end of piston rod 81 and nozzle arm 71 is a connecting link 86 to change the reciprocatory motion of piston rod 81 to the oscillating movement of nozzle arm 71.

Mounted transversely of and upwardly extending from piston rod 81 is an air poppet trigger bar 87. Said trigger bar 87 extends upwardly through aperture 88 formed in upper plate element 57 to forceably engage contact buttons 89, 90 of the left air relief poppet valve 91, and right air relief poppet valve 92. Said air relief poppets 91, 92 are coaxially mounted in opposed spaced relationship on the upper surface of plate 57 adjacent the aperture 88 formed therein. Air relief poppet valves 91, 92 are adapted to coact with a conventional balanced spool type air valve 94 to provide a means of producing the reciprocatory motion of piston rod 81, said means being to alternately supply and exhaust the air to and from the air expansion chamber 78 of piston 77.

Compressed air is supplied to the balanced spool air valve through a flexible conduit 95, such as a hose, from a source of constant pressure.

Compressed air entering said balanced spool air valve 94 passes through the passages within the same to the expansion chamber 78 of piston 77 (by means of air line 97) thereby urging piston rod 81 rearwardly thus causing nozzle arm 71 to pivot about the vertical axis of swivel joint 70 in a rearwardly extending arc.

Upon the termination of this above mentioned stroke, trigger bar 87 communicates with contact button 90 on the right hand air relief poppet valve 92 thereby causing (by means of air line 98) one of the end air chambers in balanced spool air valve 94 to be exhausted to the atmosphere. This in turn causes the air within expansion chamber 78 of piston 77 to be exhausted thereby allowing coiled compression return spring 85 to urge piston rod 81 forwardly and thus causing nozzle arm 71 to swing forwardly about the vertical axis of swivel joint 70. Upon the termination of this above mentioned return stroke trigger bar 87 communicates with contact button 89 of left air relief poppet valve 91 to then exhaust the air (by means of air line 99) from the opposite end air chamber of spool valve 94, which then returns to its initial position and allows air to flow once again to the expansion chamber 78 of piston 77. The rapidity of the succession of the above described strokes is adjustably controlled by means of a conventional air velocity control valve 96 mounted between piston 77 and spool valve 94 on air line 97 (Fig. 1).

As is seen by the above description, when roller assembly 20 is rotatably engaged by a vehicle ground wheel 30, carriage 1 is urged to travel along with and parallel to the path of travel of said ground wheel. The extent of travel of carriage 1 is preferably substantially equivalent to the circumference of wheel 30 and upon carriage 1 reaching its forward limit of travel, trigger bar 38 engages stop lug 43 on track 2 thereby releasing roller assembly 20 from engagement with wheel 30. During the course of the travel of carriage 1 with vehicle wheel 30, a mixture of steam and dissolved detergent is forcibly impinged in an oscillating manner upon the outer side of wheel 30.

To prevent the steam mixture and air from escaping while the invention is not in actual operation a pair of automatic opening and closing valves for the steam and air are provided. Said valves are secured one above the other to the inner edge of frame member 6 with their stems extending horizontally rearward in vertically coplanar relationship. Said automatic valve mechanism, generally designated 100, comprise an upper mounted steam valve 102 and a lower mounted air valve 103 rigidly affixed at their inlet ends to vertically disposed angled mounting bracket 104. The inwardly extending flange of bracket 104 is provided with a pair of apertures adapted to allow valve stems 105, 106 of valves 102, 103, respectively, to pass therethrough. Valve stems 105, 106 are adapted to be engaged by lever arm 108 which is pivotally mounted as at 109 to a pair of ears formed on the inner end of bracket 104. Integral with lever arm 108 is an inwardly directed arcuately formed lever cam 110. Lever cam 110 is partially formed to a circular arc with the innermost end 111 thereof being bent forward sufficiently far to provide an engagement ramp for a valve control roller wheel 112. Valve control roller wheel 112 is rotatably mounted atop plate member 57 adjacent the forward edge thereof and spaced inwardly from the outer edge thereof (Fig. 1).

Upon the outward movement of arm unit 50 valve control roller wheel 112 rotatably engages the lever cam 110 urging the same to swing forwardly about pivot 109 to dot-dash line position shown in Fig. 1. This in turn causes the lever arm 108 to pivot rearwardly thus allowing valve stems 105, 106 to extend also rearwardly and thereby shutting off the passage of steam and air through valves 102, 103. Lever arm 108 is yieldably urged to a forward valve open position by means of coiled tension spring 114 connected thereon and to the forward outer corner of frame member 14.

Figure 5:
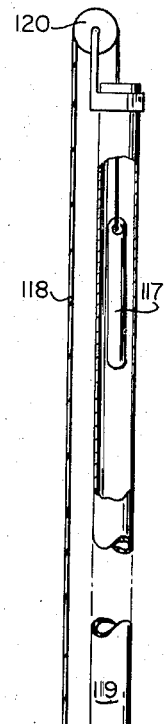
Fig. 5 is partly sectional, longitudinally broken, front view of the counterweight post illustrating a means of returning the carriage of the present invention to its starting position.

Upon the conclusion of the washing operation of the front or leading wheel 30 of a vehicle the carriage assembly 1 is disengaged from the wheel in the aforementioned manner and is returned to its initial position by means of a counterforce supplied by a counterweight 117 (Fig. 5) freely suspended within an elongated upstanding hollow post 119 from an end of rope or chain element 118. Rope element 118 passes around pulley 120 atop post 119 and extends thence vertically downward to pulley 121 at the base of mast 119, then passes therearound and extends horizontally forward to be fastened to the rear outer corner of carriage 1 as at 122 (Fig. 1). As carriage 1 is moved forwardly upon engagement with wheel 30, counterweight 117 is raised within post 119 by rope 118 to provide the potential energy, which will be utilized upon carriage 1 being disengaged from wheel 30, to return carriage 1 to its initial position. A rubber faced stop element 123 is provided, rigidly attached to track element 2 adjacent the base of mast 119, to cushion the impact resulting from said carriage being forcibly stopped from further rearward travel by stop element 123.

As previously described herein, when the invention is not in actual use, the steam and air valves 102, 103 are automatically closed by the coaction between valve wheel 112 and lever cam 110. As is apparent from Fig. 1, this above mentioned result is accomplished when arm unit 50 is withdrawn outward from wheel 30 to within carriage 1 to the dot-dash line position of parallel arm 51 indicated in Fig. 1. This, of course, places valve wheel 112 as shown bearing against lever cam 110 holding lever arm 108 in the dot-dash line valve closed position as indicated in Fig. 1.

Figure 7:
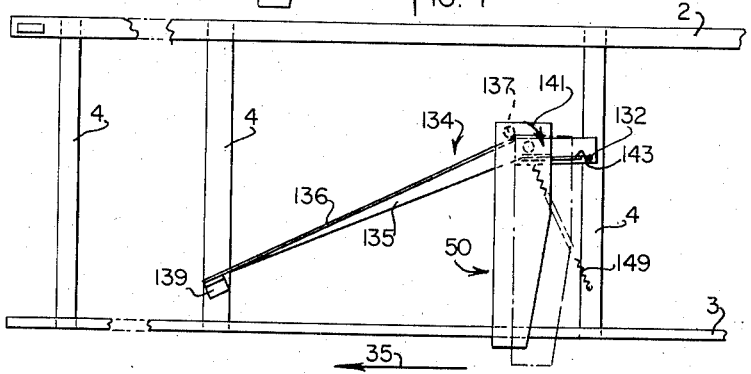
Figure 8:
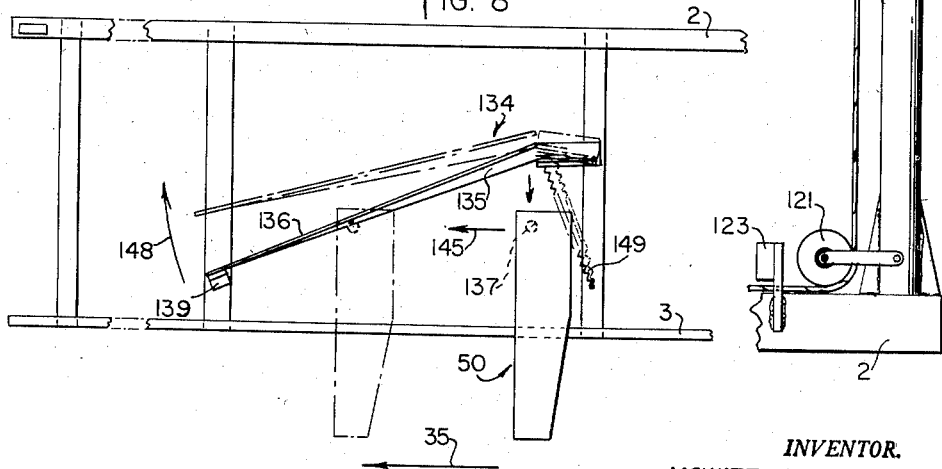

As seen in Figs. 6–8, a means of accomplishing the outwardly directed withdrawal of arm 50 to within the carriage 1 is schematically illustrated. Only such elements of the invention that are actually coacting in the withdrawal of arm 50 are illustrated, the rest of the mechanism being deleted for the sake of clarity.

Pivotally mounted, as at 132 to a cross tie 4, to swing in a horizontal plane is an elongated switching element generally designated 134 disposed substantially angularly converging with the path of travel indicated by arrow 35.

Switch 134 comprises an elongated blade portion 135 generally angle bar shaped in cross section with the vertical outer face 136 thereof adapted to intercept a switch wheel 137 rotatably mounted, coaxially with pin 55 connecting parallel arm 51 to arm unit 50, to the under surface of plate element 58 (Fig. 2). The forward end of switch blade 135 is prevented from overrotation outwardly by a rubber faced stop element 139 on a cross tie 4 forward of the cross tie to which switch 134 is pivoted.

Said interception of switch wheel 137 occurs during the return travel of carriage 1.

Fig. 6 shows the switch wheel 137, just subsequently to its interception by switch blade surface 136, being directed angularly outward as it moves rearward. Of course, since switch wheel 137 is connected to arm unit 50 by pin 55, it follows that the said arm 50 is likewise moved along the same path of travel, as indicated by arrow 140. Upon reaching the rear end of switch blade 135 (Fig. 7) as indicated in the full line position, arm unit 50 is urged inwardly, by spring 62 (Fig. 1), as shown by arrow 141 to the dot-dash line position (Fig. 7). As shown by the dot-dash line position, switch wheel 137 is held from complete inward movement by contacting the vertical fence 143 of the opposed, inner, forwardly directed wheel rest 144 integrally mounted to the forward end of switch blade 135. The opposed spacing between fence 143 and switch blade 135 is sufficient to allow the passage of wheel 137 therebetween.

Immediately upon engagement of wheel 30 against roller assembly 20 carriage 1 begins to move forward thus causing switch wheel 137 to roll forward off wheel rest 144 (Fig. 8) and thence allow spring 62 (Fig. 1) to move arm unit 50 inwardly to establish contact with vehicle wheel 30 as hereinbefore described. Upon contact with wheel 30 arm unit 50 moves forward, as indicated by arrow 145 (Fig. 8), parallel to the path of travel of arrow 35. As arm unit 50 with switch wheel 137 advances to the dot-dash line position indicated in Fig. 8, switch wheel 137 is brought to bear upon the inner side of switch blade 135 causing the latter to pivot (in the direction of arrow 148) about point 132, ultimately to the dot-dash line position shown in Fig. 8. As soon as switch wheel 137 passes beyond switch blade 135 the latter is yieldably urged to swing inward to communicate with stop 139 by coiled tension spring 149 connected between forward tie 4 and switch 134. The switch blade 135 is now again in position to intercept switch wheel 137 upon the return movement of carriage 1.

Having thus completely described the present invention, a brief recapitulation of the entire operation is as follows: As a vehicle with attached ground wheels is advancingly moved along a straight path of travel as is common in the automatic auto washing industry, the leading outer periphery of the said vehicle's leading ground wheel rotatably engages the inwardly extending driving roller assembly 20 of the invention. The driving force imparted to the carriage 1 by said roller assembly 20 then moves said carriage 1 along with and parallel to said vehicle. Subsequently, as carriage 1 begins to move forward, switch wheel 137 rolls off of switch wheel rest 144 allowing arm unit 50 to be spring urged inwardly by spring 62 towards wheel 30 to establish contact therewith by means of the inclined guide roller wheel 61 (Fig. 1). This keeps arm unit 50 at the correct distance from the outer side of wheel 30. Simultaneously with the inward movement of arm unit 50, the valve actuating wheel 112, attached to arm unit 50, disengages from lever cam 110 allowing valves 102 and 103 to be opened. This then allows the mixture of steam and detergent to be forcibly impinged upon the outer surface of wheel 30 by passing through nozzle arm 71 and the fan shaped nozzle elements 72, 73.

Simultaneous with the admission of the steam mixture to the system, the nozzle arm starts to oscillate in its predetermined arc by the admission of compressed air to the balanced spool air valve 94 and therethrough to actuate piston rod 81 in the manner hereinbefore described. This process then continues as carriage 1 moves along with the vehicle until a predetermined limit to its travel is reached. It has been found in actual practice that a path of travel substantially equivalent to the circumference of the ground wheel 30 is sufficient to completely clean the latter of all dirt and other road grime. Upon reaching the end of the forward travel of carriage 1, the outer leading edge of trigger bar 38 communicates with stop lug 43 attached adjacent to the forward end of track element 2. This then allows roller assembly 20 to be disengaged from wheel 30 as before described thus allowing carriage 1 to be returned to its initial position by the counterweight 117, acting under the influence of gravity within the upstanding post 119.

As carriage 1 is moved at a relatively rapid rate backward to its initial position switch wheel 137 is intercepted by switch blade 135 to move the arm unit 50 outward to substantially within carriage 1. As arm unit 50 is moved outward, the valve actuating wheel 112 again communicates with lever cam 110 to thereby close valves 102, 103 and thus prevent wasting the steam mixture and compressed air. When the carriage 1 comes to a stop against the rubber faced bumper element 123, the switch wheel 137 is once again resting against the switch wheel rest 144. The invention is now in place to repeat the said operational cycle with the rear or trailing wheel of the vehicle or the front wheel of a following vehicle. Since the circumference of the ground wheel 30 is substantially less than the wheel base on almost all vehicles, it is apparent that there will be a small time lapse between the return of carriage 1 to its initial position and the subsequent engagement with the rear wheel of the vehicle.

It is also obvious that the present invention is adapted to operate on either side of a vehicle and two machines of the present invention are normally disposed, one on either side of the path of travel of said vehicle, to simultaneously wash the wheels on either side of the vehicle.

Having completely described my invention in its preferred form, it is evident that many minor changes and modifications can be resorted to without departing from the spirit of the invention and the scope of the following claims.

I claim:

1. Apparatus for cleaning a vehicle wheel comprising a carriage supported for movement along a path of travel in one direction from a first point to a second point and vice versa, a wheel engaging member on said carriage adapted to be engaged at said first point by a wheel of a vehicle as said wheel rolls alongside said path in said direction for so moving said carriage, means on said carriage for spraying fluid on said wheel to clean the latter, means for disconnecting said member from said wheel at said second point and means for returning said carriage to said first point, said wheel engaging member including an arm swingably supported at one end to said carriage for movement from an outer position in the path of travel of said wheel to an inner position out of said path, spring means for urging said arm to said outer position and holding means for holding said arm in said outer position, a trigger mechanism actuatable when said carriage is at said second point for releasing said holding means to permit said wheel to urge said arm toward said inner position against the resistance of said spring.

2. Apparatus for cleaning a vehicle wheel comprising a carriage supported for movement and constrained to move along a path of travel in one direction from a first point to a second point and vice versa, a wheel engaging member swingably mounted at one end on said carriage and projecting therefrom to be engaged at said first point by a wheel of a vehicle as said wheel rolls alongside said path in said direction for so moving said carriage, means carried by said carriage for spraying fluid on said wheel to clean the latter, means for holding said member projected between said first and second points, means for releasing said holding means for permitting swinging of said member from said wheel at said second point, and means for returning said carriage to said first point, means for withdrawing said spraying means away from said wheel independently of said member when said carriage is moving toward said first point and means for urging said spraying means toward said wheel when said carriage moves toward second point.

3. Apparatus for cleaning a vehicle wheel comprising a carriage supported for movement and constrained to move along a path of travel in one direction from a first point to a second point and vice versa, a wheel engaging member swingably mounted at one end on said carriage and projecting therefrom to be engaged at said first point by a wheel of a vehicle as said wheel rolls alongside said path in said direction for so moving said carriage, means carried by said carriage for spraying fluid on said wheel to clean the latter, means for holding said member projected between said first and second points, means for releasing said holding means for permitting swinging of said member from said wheel at said second point, and means for returning said carriage to said first point, means for withdrawing said spraying means away from said wheel independently of said member when said carriage is moving toward said first point and means for urging said spraying means toward said wheel when said carriage moves toward said second point, and a roller carried by said spraying means engageable with said wheel for limiting movement of said spraying means toward said wheel.

4. Apparatus for cleaning a vehicle wheel which is rolling along a path of travel in one direction, said apparatus comprising: an elongated track extending parallel to said path of travel of said wheel, a carriage supported on said track for movement therealong in said direction from a first point to a second point and vice versa, a wheel engaging roller projecting from said carriage across said path, pivot means swingably connecting said roller directly to said carriage for swinging of said roller into and out of said path, wheel cleaning means, means mounting said wheel cleaning means on said carriage for movement independently of said roller into cleaning relationship with said wheel during movement of said carriage in said one direction, holding means connected between said roller and said carriage for holding said roller projected across said path for engagement by said wheel from said first point to said second point, and releasing means for releasing said holding means and for swinging said roller out of said path.

References Cited in the file of this patent

UNITED STATES PATENTS

| | | |
|---|---|---|
| 1,682,902 | Gibson | Sept. 4, 1928 |
| 2,134,657 | Butler | Oct. 25, 1938 |
| 2,515,047 | Latieule | July 11, 1950 |
| 2,532,211 | Welch | Nov. 28, 1950 |
| 2,541,695 | Gangewere | Feb. 13, 1951 |
| 2,574,634 | Frampton | Nov. 13, 1951 |
| 2,716,772 | Cockrell | Sept. 6, 1955 |
| 2,761,170 | Bonneau | Sept. 4, 1956 |